United States Patent [19]

Anger et al.

[11] 4,395,636

[45] Jul. 26, 1983

[54] RADIATION IMAGING APPARATUS

[75] Inventors: Hal O. Anger; Donn C. Martin; Michael L. Lampton, all of Berkeley, Calif.

[73] Assignee: Regents of the University of California, Berkeley, Calif.

[21] Appl. No.: 219,983

[22] Filed: Dec. 24, 1980

[51] Int. Cl.³ .............................................. G01T 1/24
[52] U.S. Cl. ..................................... 250/366; 250/369
[58] Field of Search .................... 250/363 S, 369, 366, 250/394, 374

[56] References Cited

U.S. PATENT DOCUMENTS

| | | |
|---|---|---|
| 2,963,390 | 12/1960 | Dickson . |
| 3,209,201 | 9/1965 | Anger ............................ 250/363 S |
| 3,423,527 | 1/1969 | Collins . |
| 3,624,399 | 11/1971 | Boer et al. . |
| 3,689,772 | 9/1972 | George et al. . |
| 3,691,389 | 9/1972 | Ellis et al. . |
| 3,715,590 | 2/1973 | Auer ................................... 250/394 |
| 3,803,416 | 4/1974 | Strauss . |
| 3,891,851 | 6/1975 | Auer ................................... 250/385 |
| 3,934,143 | 1/1976 | Prag . |
| 3,965,354 | 6/1976 | Lampton et al. ................... 250/372 |
| 4,142,101 | 2/1979 | Yin ..................................... 250/483 |
| 4,272,678 | 6/1981 | Lange ................................. 250/368 |

Primary Examiner—Bruce C. Anderson
Attorney, Agent, or Firm—Flehr, Hohbach, Test, Albritton & Herbert

[57] ABSTRACT

A radiation imaging system using a charge multiplier and a position sensitive anode in the form of periodically arranged sets of interconnected anode regions for detecting the position of the centroid of a charge cloud arriving thereat from the charge multiplier. Various forms of improved position sensitive anodes having single plane electrode connections are disclosed. Various analog and digital signal processing systems are disclosed, including systems which use the fast response of microchannel plates, anodes and preamps to perform scintillation pulse height analysis digitally.

19 Claims, 15 Drawing Figures

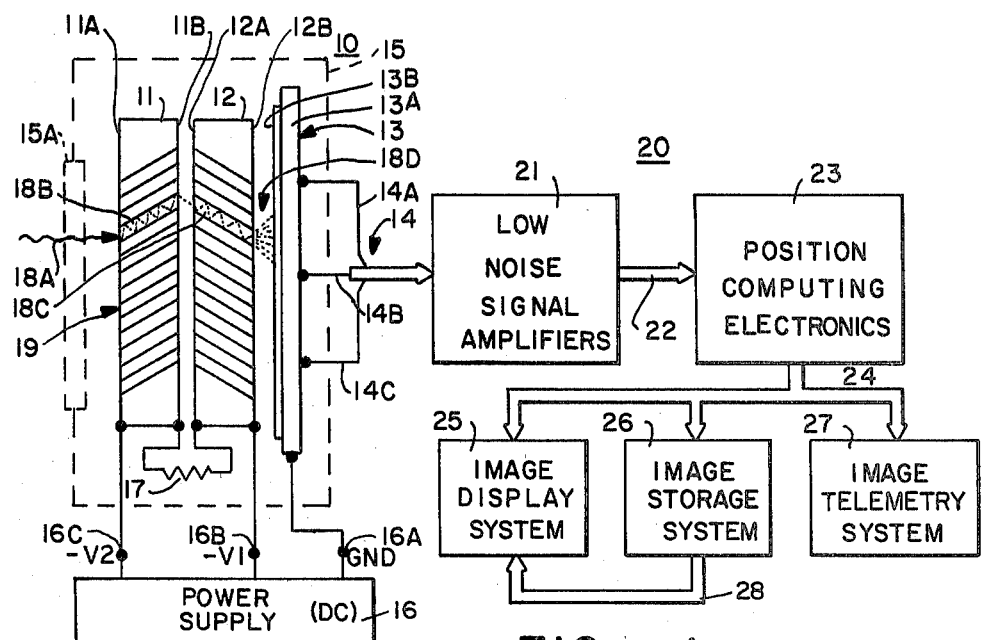
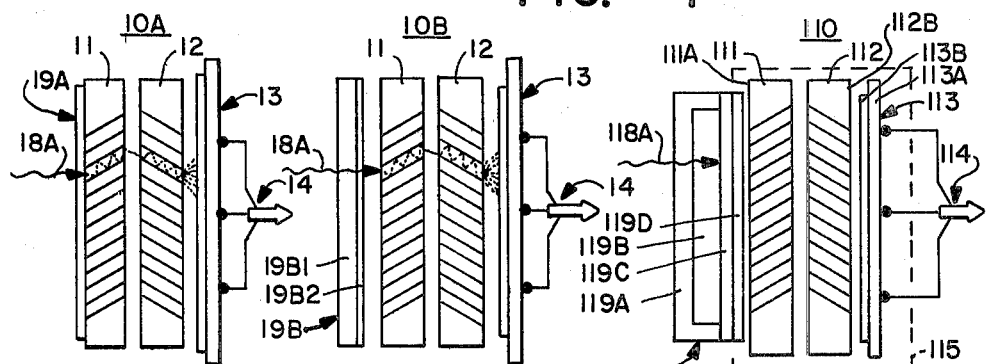
FIG.—1
FIG.—2  FIG.—3  FIG.—4
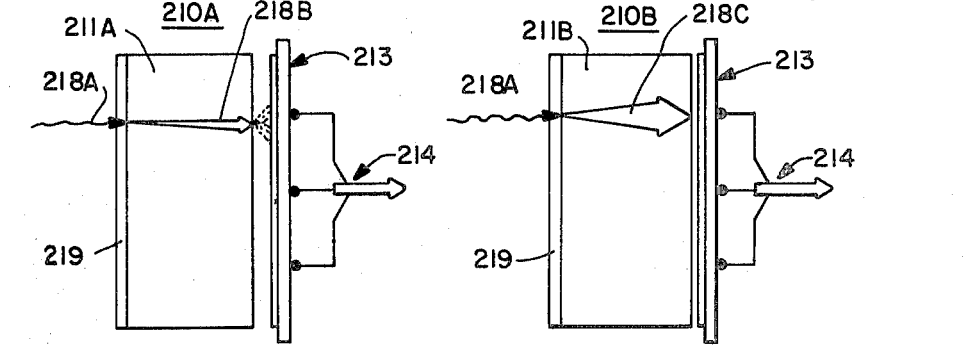
FIG.—5A  FIG.—5B

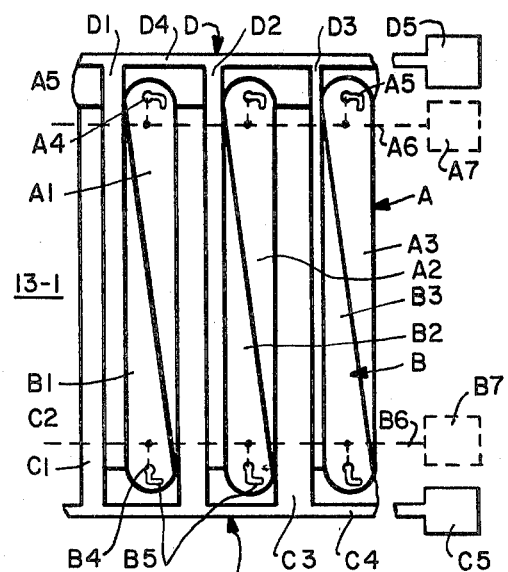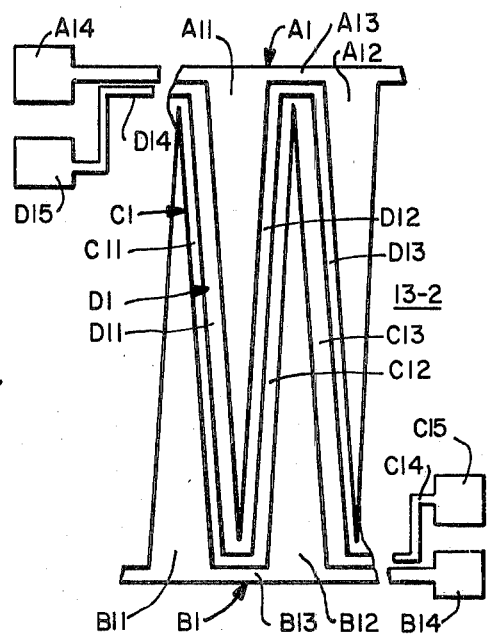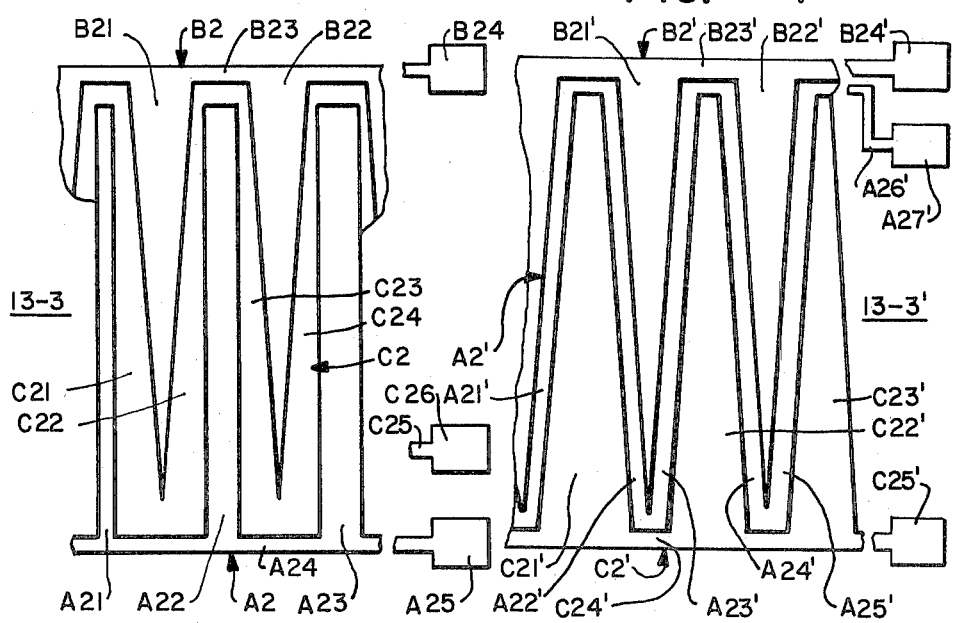
FIG.—6  FIG.—7  FIG.—8  FIG.—9

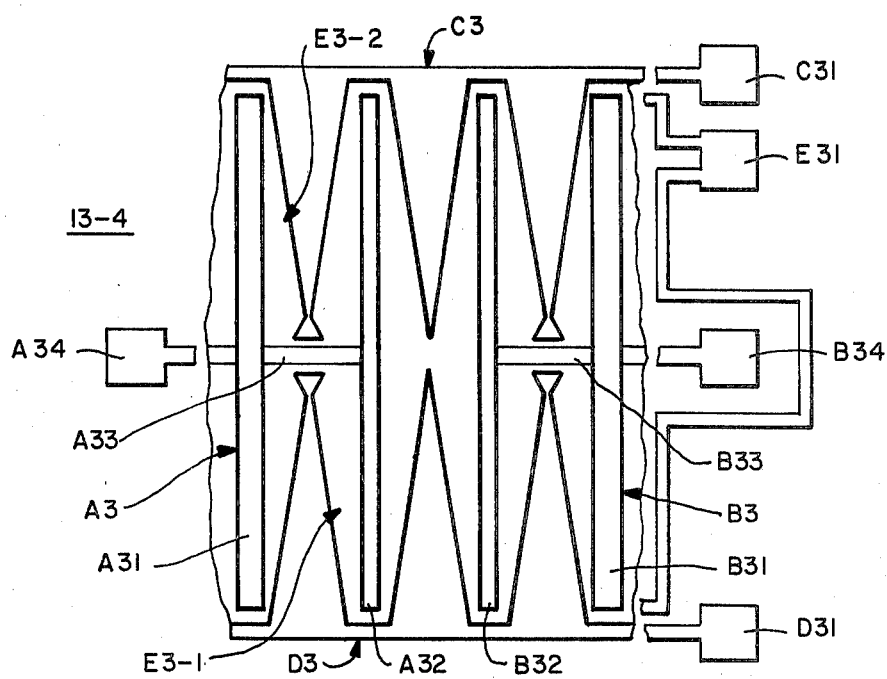
FIG.—10
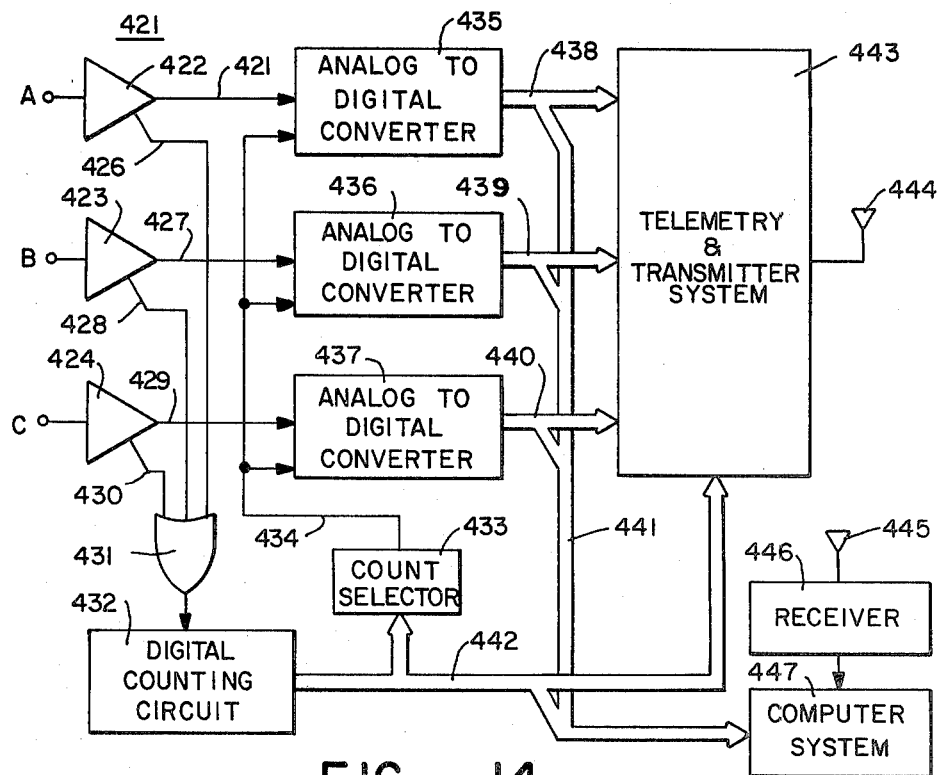
FIG.—14

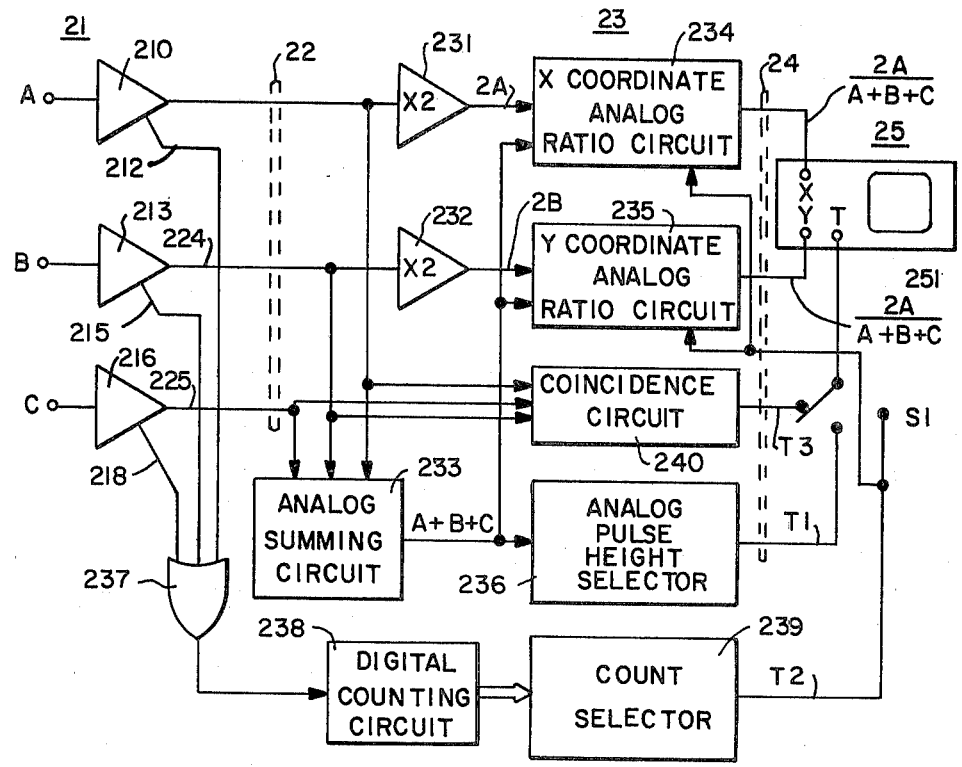
FIG.—11
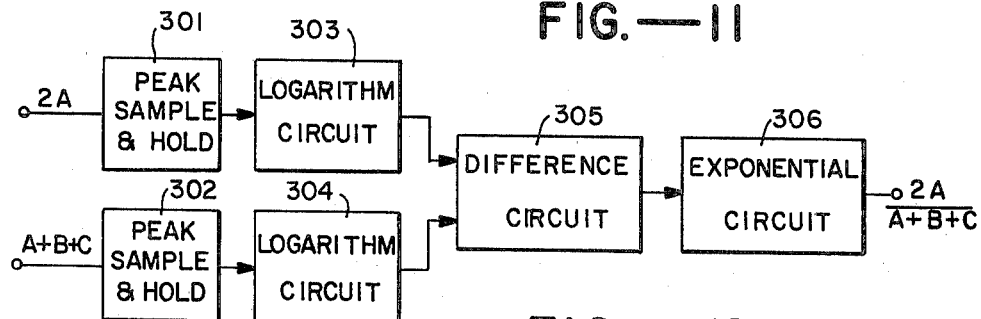
FIG.—12
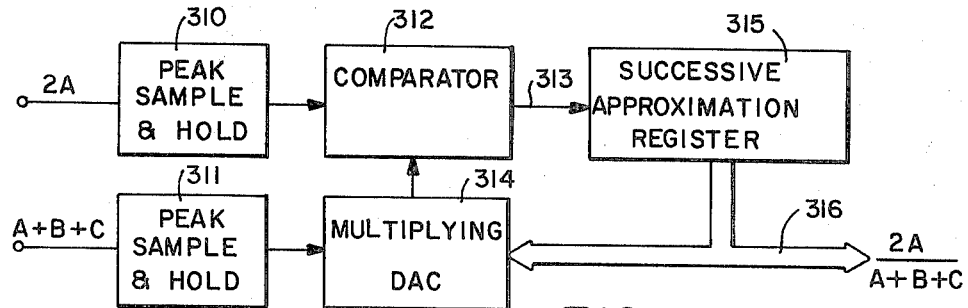
FIG.—13

RADIATION IMAGING APPARATUS

The invention disclosed herein was made in the performance of work under a NASA contract and is subject to the provisions of Section 305 of the National Aeronautics and Space Act of 1958, Public Law 85-568 (72 Statutes 435; 42 U.S.C. §2457). The government also has rights in the invention pursuant to Contract Number W-7405-ENG-48 awarded by the U.S. Department of Energy.

This invention relates generally to radiation imaging devices and more particularly to radiation imaging devices having two dimensional position coordinate readout capability.

Since the advent of the Anger-type scintillation camera disclosed in Anger U.S. Pat. No. 3,011,057, position sensitive radiation detectors have become increasingly important in the field of nuclear medicine. More recently, new laboratory and spaceborne physics and astronomy applications for position sensitive detectors have assumed increasing importance because such detectors allow spatial information to be recovered efficiently and effectively. Typical of these new applications is the use of grazing incidence telescopes in soft x-ray astronomy and of concave grating spectrometers in the study of planetary atmospheres. In these applications a detector which is sensitive over a large area with one or two dimensional spatial resolution capability is required to fully utilize the focusing and disbursing optics. When combined with an image-forming optical system, such a detector permits efficient spectroscopic measurement of extended sources or enables sensitive detection of point image whose positions are unknown. High resolution two dimensional imaging is particularly advantageous where a point object is to be detected in the presence of a diffused background as in many x-ray astronomy applications.

Several commercial versions of Anger-type scintillation cameras as disclosed in Anger U.S. Pat. No. 3,011,057 are now commercially available. In this type of radiation imaging device a plurality of phototubes are disposed a short distance away from a scintillation crystal which converts incident gamma rays into flashes of light. The light photons produced during each scintillation event travel away from the event in all directions. Some of the light photons fall directly on the array of photomultiplier tubes with the tubes closest to the scintillation receiving the most light. Each of the photomultiplier tubes develops an amplified electron output signal corresponding to the number of light photons incident upon its photocathode. Output signal weighting, summing, and ratio computing circuits are utilized to develop an X-Y coordinate electrical signal generally corresponding to the position of the original gamma ray incident upon the scintillator. The scintillator and phototube combination have inherent characteristics of limited resolution and moderate geometric non-linearity in determining the position of the original gamma ray.

In an attempt to develop a gamma ray camera with improved inherent resolution and improved spatial linearity, Anger proposed a coordinate photomultiplier tube which is disclosed in Anger U.S. Pat. No. 3,209,201. The coordinate photomultiplier tube utilizes a large semitransparent photocathode, a series of venetian blind multiplying dynodes and a special position sensitive anode which consists of a repetitive pattern of wedge and strip anode regions. The repetitive pattern of charge collecting strip and wedge regions is geometrically arranged and connected to encode the charge cloud incident thereon from the venetian blind dynodes into a plurality of electrical signals which indicate the coordinate position of the centroid in a rectangular coordinate system. Venetian blind dynode structures of the type utilized in this gamma ray camera are difficult to construct with the required resolution and attempts to build a coordinate indicating phototube utilizing a position sensitive anode were unsuccessful.

Within the past several years microchannel electron multiplying plates have become commercially available to utilize as charge multiplication devices in radiation imaging apparatus. Because of the high inherent resolution of microchannel plates, they have been utilized in laboratory ultraviolet and vacuum ultraviolet spectroscopy and vacuum ultraviolet and x-ray space astronomy. Critical to the achieving of overall effective readout of the individual quantum events detected in the microchannel plate is the provision of a position sensitive anode with high spatial resolution and good geometric linearity. Numerous readout systems have been suggested in the prior art, including arrays of separate anodes in one and two dimensions, crossed grid coincidence arrays, charge division grids with adjacent wires capacitively or resistively coupled, continuous resistive anodes in one or two dimensions and quadrant anodes. A continuous resistive anode is disclosed in Lampton et al. U.S. Pat. No. 3,965,354. A quadrant anode is disclosed in Lampton et al, "Quadrant Anode Image Sensor", RSI, Vol. 47, No. 11, November 1976, p. 1360. Although the resistive anode has geometries which can give it good spatial linearity, it is subject to an irreducible thermal charge noise which limits the achievable spatial resolution. On the other hand, the simple quadrant anode is capable of very high spatial resolution, but suffers from severe spatial non-linearity.

It is an object of this invention to provide an improved apparatus for imaging individual quanta in the form of incident photons, ions, electrons or nuclear particles.

It is a further object of this invention to provide radiation imaging apparatus having high inherent spatial resolution and high spatial linearity.

It is a further object of this invention to provide an improved position sensitive anode.

One aspect of this invention features apparatus for imaging incident photons, ions, electrons or nuclear particles either as individual quanta or as a beam. The imaging apparatus includes event detecting means including at least one microchannel electron multiplying plate, with input surface means for detecting an incident event and supplying at least one free electron to said microchannel plate and an output surface emitting a multiplied electron charge cloud spatially correlated to the position of said detected event. A position sensitive anode means is mounted parallel to said output surface and at a moderate distance therefrom to permit said emitted electron image to expand to a charge cloud before striking said anode means. The centroid of the charge cloud is spatially correlated to the position of the incident event, i.e. the coordinate position of an individual incident quanta, or the centroid of the incident beam as the case may be. The anode means comprises a repetitive pattern of charge collecting regions geometrically arranged and connected to encode the charge cloud incident thereon into a plurality of electrical signals indicating the coordinate position of the centroid in a preselected coordinate system.

The position sensitive anode means preferably comprises an insulating substrate with a thin layer of metal carried on a front surface thereof facing the output surface of the event detecting means. The thin layer of metal is formed into a repetitive pattern of charge collecting regions and the geometric arrangement of the regions is preselected to permit interconnection thereof by regions of the metal layer itself. In one embodiment, the geometric arrangement of the charge collecting regions consist of four sets of regions comprising two sets of wedges and two sets of strips. Two of the four sets are interleaved across the width of the anode. The other two sets are disposed in continuously connected zig-zag arrays between the separated edges of the interleaved regions. All of the wedges have a charge collecting area varying linearly from apex to base. The two sets of strips have widths which vary linearly in opposite senses with the positions of the strips across the width of the anode and having equal widths at the center of the anode. For this anode embodiment the coordinate position of the centroid of charge arriving at the anode is given by one of the sets of equations $X = C/(C+D)$, $Y = A/(A+B)$ for X and Y varying between 0 and 1 and $X = (C-D)/C+D)$, $Y = (A-B)/(A+B)$ for X and Y varying between $-1$ and $+1$, where C and D are the magnitudes of charge collected on the first and second sets of strips, respectively, and A and B are the magnitudes of charge collected on the first and second sets of wedges, respectively.

In another embodiment the geometric arrangement of the charge collecting regions consists of three sets of regions comprising one set of wedges, one set of strips and one set of trapezoids, two of said sets being interleaved across the width of said anode and the third set being disposed in a continuously connected array between said interleaved sets. The wedges have identical geometries and the charge collection area of each wedge vary linearly from apex to base thereof. The strips have respective widths varying linearly from one side of the anode to the other. The trapezoids have major and minor base dimensions which vary from one side of the anode to the other in a sense opposite to that of the strips. The respective geometries of the sets of wedges, strips and trapezoids is arranged such that the coordinate position of the centroid is given by $X = 2A/(A+B+C)$, $Y = 2B/(A+B+C)$ where A is the magnitude of charge collected on the set of strip regions, B is the magnitude of charge collected on the set of wedge regions, and C is the magnitude of charge collected on the trapezoidal regions.

The improved position sensitive anodes of this invention may be applied in any radiation imaging apparatus to detect the centroid of a cloud of charged particles incident thereon. Accordingly, in accordance with another aspect of this invention a position sensitive anode is provided which is adapted to detect the centroid of a cloud of charged particles incident thereon. The anode comprises an insulating substrate with a thin layer of metal carried on a front surface thereof for intercepting the cloud of charged particles. The thin layer of metal is formed into a repetitive pattern of charge collecting regions geometrically arranged and connected to encode the charge cloud into a plurality of electrical signals indicative of the position of the centroid. The geometric arrangement is preselected to permit interconnection of sets of strip and wedge regions by regions of the metal layer itself. The position sensitive anode may have geometries of charge collecting regions according to either of the two embodiments previously described.

In accordance with another aspect, this invention features apparatus for imaging of incident radiation comprising means for detecting radiation and producing a traveling electron cloud in response thereto with the centroid of the electron cloud spatially correlated to the position of the detected event and a position sensitive anode interposed in the path of the electron cloud for detecting the coordinate position of the centroid thereof in a preselected coordinate system with the position sensitive anode having the improved anode characteristics of the various embodiments previously described.

The combination in a radiation imaging apparatus of a microchannel plate and a position sensitive anode of the repetitive strip and wedge region type results in an imaging device with high inherent resolution, high speed and high spatial linearity. The speed is equal to that achieved with the four quadrant anode disclosed in the above-referenced Lampton and Malina article and is much higher than that achieved with the resistive anode disclosed in the above-identified Lampton et al. patent. The spatial linearity is much better than that obtained with the quadrant anode. The inherent resolution over the full field is also better than that obtained with either the resistive or quadrant anode.

The multi-segment anode geometries of this invention constitute improvements over the wedge and strip geometries of the anode disclosed in the Anger U.S. Pat. No. 3,209,201 by providing for self-connection of the sets of wedge and strip electrodes in a single metal electrode plane. Furthermore, one embodiment of the improved multi-segmented anode of this invention has the additional advantage of requiring only three sets of anode regions, thereby reducing the number of low noise amplifier circuits required for processing signals from the anode.

Other objects, features, and advantages of this invention will be apparent from a consideration of the following detailed description in conjunction with the accompanying drawings.

FIG. 1 is a schematic representation of a radiation imaging apparatus in accordance with this invention.

FIG. 2 is a schematic representation of an alternative embodiment of a radiation imaging detector in accordance with this invention.

FIG. 3 depicts another alternative embodiment of a radiation imaging detector in accordance with this invention.

FIG. 4 depicts another alternative embodiment of a detector head for a radiation imaging apparatus in accordance with this invention.

FIGS. 5A and 5B show alternative general embodiment of a detector head for a radiation imaging apparatus in accordance with this invention.

FIGS. 6 through 10 are schematic diagrams of various embodiments of position sensitive anodes of the wedge and strip type which are useful in detector head portions of radiation imaging apparatus in accordance with this invention.

FIG. 11 is a block schematic diagram of one embodiment of the electronics circuitry portion of radiation imaging apparatus in accordance with this invention.

FIGS. 12 and 13 are block diagrams of analog and digital ratio circuits useful in the electronic circuitry of FIG. 11.

FIG. 14 is a block schematic diagram of alternative signal processing circuitry in radiation imaging apparatus according to this invention.

Referring now to FIG. 1, it is seen that the major components of a radiation imaging system in accordance with this invention are a detector head 10 and signal processing circuitry 20. The detector head embodiment shown in FIG. 1 involves the use of a pair of microchannel plates 11 and 12 as the electron multiplying means. The two microchannel plates are mounted with the back surface 11B of microchannel plate 11 positioned in close proximity to the front surface 12A of microchannel plate 12. The back surface 12B of microchannel plate 12 is connected to a power supply 16 to receive a negative voltage $-V1$ on terminal 16B. The front surface 11A of microchannel plate 11 is connected to terminal 16C on power supply 16 to receive a large negative voltage $-V2$. The back surface 11B of microchannel plate 11 and the front surface 12A of microchannel plate 12 are connected together through a small resistor 17. It is not critical that an actual resistor 17 be provided and a mere wire interconnection will suffice. The spacing between microchannel plates 11 and 12 is not critical and may, for example, be about 250 micrometers.

For some applications the front surface region 11A of the first microchannel plate 11 can itself serve as an input detector surface means for detecting an incident event. For example, the front surface of the multichannel plate is itself sensitive to soft x-rays and ultraviolet radiation up to a wavelength of about 2000 Angstroms with a peak quantum efficiency of about ten percent at a wavelength of around 200 Angstroms. The front surface is also capable of detecting other radiation quanta such as ions, electrons, or various nuclear particles having a wide range of energies. The quantum efficiency of detection, of course, varies with the energy of and type of incident radiation quanta.

As shown in FIG. 1, when an individual radiation quantum 18A strikes the front detecting surface 19 and produces a free electron at a particular spatial position, this free electron enters a nearby channel of the microchannel plate 11 and produces an accelerated and multiplied electron image 18B as secondary electrons repeatedly strike the side walls of the individual channel of the microchannel plate 11. Thereafter the accelerated multiplied electron stream 18B exits the back surface 11B of microchannel plate 11 and enters a spatially associated channel of microchannel plate 12 wherein the electron stream 18C is further accelerated and multiplied.

Positioned a moderate distance behind the back surface 12B of the second microchannel plate 12 is a position sensitive anode 13. Position sensitive anode 13 comprises an insulating substrate 13A and a layer of metal 13B carried thereon and fashioned into a repetitive pattern of charge collecting regions. The charge collecting surface 13B of anode structure 13 is spaced a moderate distance from the back surface 12B so that the electron stream 18C traversing microchannel plate 12 will expand into an electron cloud 18D prior to striking the wedge and strip anode structure 13B. The centroid of this electron cloud will be spatially correlated to the coordinate position of the detected event 18A.

The repetitive pattern of charge collecting regions on anode assembly 13 may involve a number of different topographical patterns including those illustrated in FIGS. 6 through 10. The repetitive pattern of sets of charge collecting regions of the various arrangements shown in FIGS. 6 to 10 all share the same characteristic of being geometrically arranged and connected to encode the charge cloud 18D into a plurality of electrical signals indicating the coordinate position of the centroid of the charge cloud in a preselected coordinate system.

It should be understood that the detector head 10 could also be used to detect the centroid of a beam of radiation quanta striking the front surface of the microchannel plate in substantial time coincidence as well as detecting the position of a single incident event. Accordingly the term "detected event" will be used to refer to both imaging conditions unless otherwise indicated.

The sets of charge collecting regions on the anode are connected via a conductor arrangement 14 (with separate conductors 14A, 14B, and 14C for example coupled to individual interconnected sets of strip and wedge regions) to low noise signal amplifiers 21. Low noise signal amplifiers integrate the charge collected on each set of anode regions and produce an output signal on individual output lines in bus 22 having a magnitude corresponding to the collected charge on an associated set of anode regions. The outputs from the low noise signal amplifiers 21 are coupled to position computing electronics 23 which operates on the amplified signal information from the sets of anode regions and computes the coordinates of the centroid of the charge cloud striking the anode. This computation of the position coordinates may be carried out either in an analog or a digital fashion or a hybrid analog/digital fashion. The position coordinate output signals from position computing electronics 23 are provided on output bus 24 and may be utilized to display the coordinates of the event on an image display system 25 or to store the event in an image storage system 26 or to transmit the position coordinates of the detected event to a remote location via image telemetry system 27.

For some radiation imaging systems it is sufficient to simply display the position coordinates of each event in essentially real time on an image display system such as a cathode ray tube. A series of individual quanta detected by the radiation detecting apparatus will then be displayed as a series of light flashes or dots on the CRT screen at spatial positions coordinated with the position coordinates of the detected event. Photographic film or other means may be utilized to integrate the sequential dot display on the CRT into an overall image of the detected events.

For some applications it is desirable to store the image data in some type of image storage system so that the overall image can later be recovered or, if the storage is digital, so that various manipulations of the data can be performed. Image storage system 26 may comprise, for example, a direct data storage of the individual coordinate signal events on a tape recorder. One type of system for accomplishing this is disclosed in Clark U.S. Pat. No. 3,691,545.

Other forms of image storage systems involve direct digital storage of the accumulated events in digital storage locations addressed by the digitized version of the position coordinate signal. Each pixel of the image may be assigned a byte of storage area with the value of the byte being incremented each time an event occurs at the associated position coordinates which address that byte. Various approaches can then be utilized to read out the stored image to display it or to analyze the image data in various ways, such as by creating histograms or counting events in various sections of the image.

Image telemetry system 27 may take various forms depending on the application. For example, telemetry of digital position coordinate signals from a spaceborne radiation imaging apparatus may utilize standard telemetry systems for spacecraft.

If the radiation imaging apparatus is utilized in a spaceborne application the microchannel plates and position sensitive anode need not be enclosed in an evacuated chamber. However, if the radiation imaging apparatus is to be employed in earth's atmosphere, an enclosure 15 must be provided around the detector head components with the interior of the enclosure evacuated to at least about $10^{-6}$ Torr. A window 15A is then provided in the enclosure 15 in order to admit radiation quanta to be detected on the detector surface 19.

As previously indicated the optics utilized in front of the radiation imaging detector head 10 will be determined by the application. For soft x-ray and vacuum ultraviolet astronomy a grazing incidence reflector may be positioned in front of the detector head. To study planetary atmospheres a concave grating spectrometer may be utilized. A standard type lens arrangement may be utilized for military night vision applications where display of the image is desired at a location remote from the detector itself. In some potential applications such as x-ray shadow imaging from a point source, no optics in front of the detector are required to form the image on the detecting surface 19.

FIG. 2 illustrates a detector head version in which the quantum efficiency of the detection of radiation quanta is increased by forming a thin coating of electron emissive material 19A on the front surface of microchannel plate 11. Materials such as cesium iodide or magnesium fluoride may be used, for example, to increase the cutoff wavelength of radiation which can be detected. Use of this coating will increase the cutoff wavelength to about 5000 Angstroms and provide higher quantum efficiency for detection of radiation quanta throughout a large portion of the effective wavelength region.

FIG. 3 illustrates a detector head version in which a cathode structure 19B is provided in front of the first microchannel plate 11. The cathode structure 19B consists of a transparent substrate 19B1 and a thin cathode 19B2 formed on a back surface thereof. Depending on the thickness and material of the substrate 19B1 photons having wavelengths up to about 10,000 Angstroms may be detected with the cathode 19B2 also providing higher quantum efficiency.

FIG. 4 illustrates another embodiment of a detector head 110 which utilizes a scintillator and photocathode arrangement 119 for detecting the individual radiation quanta 118A incident thereon. The scintillator and photocathode assembly 119 includes a scintillator housing 119A in which a scintillator 119B is mounted. A glass cover plate 119C is mounted over the scintillator 119B and a thin layer of photocathode material 119D is coated on the glass cover 119C. In this embodiment the scintillator 119B responds to individual incident radiation quanta by converting the energy of the incident quanta to a flash of light. Photons from the scintillation arrive at the photocathode 119D with a centroid of photon distribution spatially correlated with the position coordinates of the initial event. The photocathode transforms the incident photons thereon into electrons which strike the surface of the microchannel plate 111 causing a corresponding cascade of electrons throughout a number of the channels in the microchannel plate. If the electron cloud already created by the photon cloud arriving at the first microchannel plate is of sufficient size relative to the size of the repeating pattern of charge collecting regions on anode 113, the position sensitive anode structure 113 may be placed very close to the back surface 112B of the second microchannel plate 112.

FIGS. 5A and 5B illustrate generally the types of charge multiplier and position sensitive anode arrangements which may be utilized in connection with this invention. In FIG. 5A, the charge multiplying device designated 211A is represented as the type of device which confines the multiplied charge beam to a narrow beam 218B which exits the charge multiplier at a spatial position correlated with the detected event 218A. Using this type of charge multiplier the anode 213 is purposely spaced a prearranged distance from the output surface of the charge multiplier to provide for spreading of the charge cloud footprint prior to striking the charge collecting surface of the anode. In FIG. 5B the charge multiplier device 211B is the type which produces a multiplied charge image which expands in its footprint size as it traverses the charge multipying device. If the expanded footprint size of the charge cloud is of sufficient area with respect to the size of the repeating pattern of charge collecting regions on anode 213, the anode may be positioned very close to the exit surface of the charge multiplier device. From FIGS. 5A and 5B together with FIG. 4, it can be seen that there are numerous spatial relationships which may exist between the radiation event detection surface or component, the charge multiplication device, and the position sensitive anode. The important factor is that the size of the charge cloud footprint striking the charge collecting regions on the anode be sufficient with respect to the size or period of the repeating pattern of charge collecting regions on the anode. This size relationship will be discussed in more detail below. However, at this point, it should be understood that the production of a charge cloud of sufficient footprint size striking the anode may be achieved in accordance with several parameters. One of the parameters is the area of the charged particle beam incident on the charge multiplying device due to the nature of the detected event. The second parameter is the expansion of the charge cloud, if any, in the charge multiplying device itself. The third factor is the separation distance between the exit surface or area of the charge multiplying device and the surface of the position sensitive anode.

In general the charge multiplying devices which may be utilized in connection with this invention include, for example, microchannel plates, and electron multiplier tubes utilizing either transmission dynodes or mesh dynodes. In addition, the charge multiplying device may be a gas proportional detector utilizing a confined volume of highly purified gas such as methane, xenon or argon. With each of the various types of charge multiplying devices the overall structural arrangement of the elements of the charge multiplying device will determine the charge cloud spreading characteristics and thus determine the spatial relationships between the components which must be employed in order to achieve a charge cloud of sufficient footprint size.

FIG. 6 illustrates one version of a position sensitive anode 13-1 which utilizes two sets of interconnected wedges A and B and two sets of interconnected strips C and D. The geometric arrangement of the wedge and strips in anode 13-1 corresponds generally to that shown in the above-identified Anger U.S. Pat. No. 3,209,201. As can be seen from FIG. 6, there exists a repeating quartet of wedges and strips across the width of the anode. At the left of FIG. 6 the first quartet consists of wedges A1 and B1 and strips C1 and D1. This quartet of wedges and strips is repeated across the width of the anode. Each of the wedges of the A set, designated A1, A2, and A3, have the same geometry and a charge collection area which varies linearly from bottom to top of the anode. At the large top area of each anode, a wire A5 is attached to the respective wedges and extends through an aperture A4 to the back of the anode and connects to a signal bus A6 leading to a signal output pad A7.

Similarly the B set of wedges, B1, B2, and B3 are wired through the anode structure using wires B5 extending through apertures B4 and connecting to a common signal bus B6 on the back of the anode structure to couple the signals to an output pad B7. All of the C set of strips, C1, C2, and C3 are interconnected by way of a signal bus C4 extending the width of the bottom of the anode and leading to an output signal pad C5. Similarly all of the D set of strips, D1, D2, and D3 connect to a signal bus D4 leading to an output signal pad D5. The output signal pads C5 and D5 may be a portion of the common buses C4 and D4 if the common buses are made wider at the top and bottom of the anode.

As shown in FIG. 6, the C strips have widths which increase linearly from left to right across the width of the anode 13-1 whereas the D strips have widths which decrease linearly from left to right across the anode 13-1. In an actual anode structure many more quartets of wedges and strips would be provided across the width of the anode. In the central region of the anode, each electrode occupies one-fourth of the local area. Away from the center of the anode the areas occupied by each electrode varies linearly with position.

It is this property which makes the anode centroid-sensitive, because arriving charge is divided between the two strip electrodes with partition coefficients that are linearly dependent upon X and arriving charge is divided between the two wedge electrodes with coefficients that are linearly dependent upon Y.

For the partition coefficients to be linear in terms of the respective charge magnitudes collected by the wedge and strip electrodes, the footprint of charge arriving at the anode must be substantially larger than the width of one wedge and strip quartet. Accordingly, as such a cloud of electrons strikes the anode, each wedge and strip electrode collects the charge which falls upon it and that charge is coupled to the corresponding output signal pad associated with that set of anode regions. The output signal pads A7, B7, C5, and D5 thus contain collected charge information which indicates the coordinate position of the centroid of the charge cloud in a rectangular coordinate system. The coordinate position of the centroid is given by the equations $X = C/(C+D)$, $Y = A/(A+B)$ for X and Y coordinates varying between 0 and 1. Alternatively, the coordinate position is given by $X = (C-D)/(C+D)$, $Y = (A-B)/(A+B)$ for X and Y coordinates varying between $-1$ and $+1$. The A, B, C, and D variables in these equations corresponds to the total magnitude of charge collected on the output signal pads, A7, B7, C5 and D5.

While the front charge collecting surface of the anode 13-1 depicted in FIG. 6 may be formed using photolithography techniques on a metal layer carried on the front side of a printed circuit board, the requirement of connecting the wedge regions through apertures in the anode structure to signal buses on the back plane of the anode structure results in additional manufacturing complexity and cost. In a large anode having many quartets of wedge and strip regions, the number of connections that have to be made is substantial and each of these connections represents a potential defect or failure point which could affect the performance of the anode in the detector head.

FIG. 7 illustrates an improved anode structure which also utilizes two sets of wedge regions and two sets of strip regions, but provides self-interconnection of the strip regions by disposing the strip regions as continuously connected arrays across the anode between the separated wedge regions in each of the two sets thereof. Thus, as can be seen in FIG. 7, the wedges in the A1 set, for example, A11 and A12 are separated from each other so that the wedges in the B1 set, for example B11 and B12 may be interleaved between the regions of the A1 set. The individual wedges of the A1 set are connected together via a common bus A13 leading to an output signal pad A14. Similarly, the individual wedges of the B1 set are interconnected by a signal bus B13 leading to an output signal pad B14.

The wedges in the A1 and B1 sets are separated from each other by a distance large enough to accommodate the array of continuously connected strip regions C1 and D1. The C1 strips, for example C11, C12, and C13 as shown in FIG. 7, form one continuously connected array which winds its way through the interleaved wedges, being on different sides of the gap between wedges. Similarly the D1 set of strips, for example the D11, D12, and D13 strips shown in FIG. 7, form a continuously connected array. The D1 strips are always adjacent the A1 wedges and the C1 strips are always adjacent the B1 wedge regions. The array of C1 strips is ultimately connected on one end via a bus C14 to an output signal pad C15. The D1 set of strip regions is ultimately connected via a bus D14 to a output signal pad D15.

The overall geometric charge collecting characteristics of the anode 13-2 shown in FIG. 7 are essentially the same as the anode 13-1 shown in FIG. 6. The A1 and B1 sets of wedges have charge collecting areas which vary linearly with the Y position. The C1 set of strips have widths which increase linearly from left to right across the width of the anode whereas the D1 regions have widths which decrease linearly from left to right across the width of the anode. At the center of the anode the area fractions occupied by each of the wedges and strips in the four sets thereof is one-fourth of the total area of a charge cloud arriving thereat with a centroid at the center of the anode. Away from the center of the anode the relative areas occupied by the sets of wedges and strips vary linearly with position so that anode 13-2 is also centroid-sensitive and the magnitude of charge coupled to the output signal pads A14, B14, C15, and D15 contain information indicating the coordinate position of the centroid of a charge cloud striking the anode, from whic centroid position coordinates can be calculated using one of the same sets of equations given above.

Because of the self-interconnection feature of the anode 13-2 shown in FIG. 7, the complete anode structure can be fabricated using photolithography techniques on a single thin layer of metal on a printed circuit board. This substantially reduces the overall manufacturing cost of the anode and renders it less subject to manufacturing defects and potential operating failures in a detector head structure.

In the particular four electrode set configuration shown in FIG. 7, the opposing triangular wedges are seen to surround a pair of interleaved sets of rectangular strips connected in serpentine or zigzag fashion. It is, of course, equally possible to have opposing rectangular strip groups, between which pairs of triangular wedges are interleaved and are connected in serpentine fashion. It is also equally possible to configure a four-electrode anode so as to have one strip group and one triangular wedge group oppose one another in interleaved fashion, between which a second group of triangular wedges and a second group of rectangular strips are disposed in continuously connected zigzag arrays. Accordingly, the common characteristic of all of the topographies is the use of two sets of strips and two sets of wedges with two of the four sets being interleaved across the width of the anode with interleaved edges separated from each other. The other two sets are then disposed in a continuously connected array between the interleaved sets.

FIG. 8 illustrates a position sensitive anode 13-3 having a geometric configuration of wedge and strip regions which also utilizes the improved feature of self-interconnection in a single anode plane, but requires only three sets of electrodes to encode the incident charge cloud into electrical signals indicating the coordinate position of the centroid thereof. The position sensitive anode 13-3 utilizes one set of strips A2, one set of wedges B2 and one set of traepzoids C2. Each of the wedges is identical in geometric configuration. The strips of the A2 set are interleaved with the wedges of the B2 set. The widths of the strips, for example, A21, A22, and A23 of the A2 set increases linearly from left to right across the width of the anode 13-3.

Electrode C1 is comprised of a continuously interconnected array of trapezoidal regions disposed between the strips A2 and the wedges B2. The trapezoids of the C2 set have charge collecting areas which vary in both X and Y directions.

The position sensitive anode 13-3 shown in FIG. 8 encodes a charge cloud incident on the anode into three charge magnitude signals, A, B, and C on the output signal pads A25, B24, and C26, respectively. With these encoded signals, the X and Y position coordinates of the centroid of the charge cloud striking the anode 13-3 are given by the equations $X=2A/(A+B+C)$, $Y=2B/(A+B+C)$.

The position sensitive anode 13-3 has the advantage of self-interconnection of all of the wedge and strip regions on the front plane of the anode and further has the advantage that only three encoded output signals are required to indicate the position coordinates of the centroid of a charge cloud incident on the anode. Thus, the anode 13-3 has all of the manufacturing advantages of the anode 13-2 depicted in FIG. 7 and provides a further advantages that only three low noise amplifier circuits are required for processing the charge magnitude output signals from the anode. Accordingly, with the position sensitive anode 13-3 manufacturing cost savings are achievable both in the detector head portion and the electronic circuit portion of a radiation imaging apparatus.

In the particular three-electrode configuration shown in FIG. 8, the triangular wedge group which is responsible for the vertical or Y axis position sensitivity and the strip group which is responsible for the horizontal or X axis sensitivity are interleaved and surround the group of remaining trapezoidal electrodes which are connected in serpentine fashion between the interleaved wedges and strips. However, it is also equally possible to configure the three-electrode anode so that the trapezoidal group and the triangular wedge group are interleaved with a group or set of strips connected in serpentine fashion therebetween such as shown in FIG. 9. As shown in FIG. 9 the C2' set of trapezoids is interleaved with the B2' set of wedges and the A2' set of strips zig-zags between the interleaved wedges and trapezoids. It is also equally possible to configure a three-electrode position sensitive anode so that the trapezoidal group and the strip group are interleaved and the wedges are arrayed between the interleaved groups. The common characteristic of the three-electrode position sensitive anode is that it consists of three sets of regions comprising one set of wedges, one set of strips, and one set of trapezoids with two of the three sets of regions being interleaved across the width of the anode and the third set being disposed in a continuously connected array between the interleaved sets.

FIG. 10 depicts a five-electrode position sensitive anode 13-4 which also has the characteristic that all of the electrodes have an interconnection in a single electrode plane. In the five-electrode anode 13-4, two sets of strips A3 and B3 are employed along with two sets of wedges C3 and D3 and a set of trapezoids E3. The position computing algorithm for this five-electrode anode is $X=(B-A)/(A+B+C+D+E)$ and $Y=(C-D)/(A+B+C+D+E)$.

From FIGS. 6 to 10, it should be apparent that there is a family of position sensitive anode topographies which have the feature of interconnection in a single plane and each have a particular position computation algorithm associated therewith. In addition to the position sensitive anodes depicted which utilize a rectangular coordinate system, it is possible to configure anodes with geometries which enable the use of a polar coordinate system.

FIG. 11 illustrates in more detail the detector electronics 23 which would be utilized to process the signals from a position sensitive anode 13-3 shown in FIG. 8 (or anode 13-3' in FIG. 9). The input terminals A, B, and C would be connected respectively to the output signal pads A25, B24, and C26 in FIG. 8. Individual low noise charge sensitive amplifiers 210, 213, and 216 integrate the charge collected on associated sets of anode regions and produce a shaped and amplified output pulse on slow output signal lines 221, 224, and 225, respectively. These shaped and amplified output signals are coupled into analog summing circuit 233 which develops an output signal corresponding to the summed charge magnitude $(A+B+C)$. The outputs of amplifiers 210 and 213 are fed to a second set of amplifiers 231 and 232 where the signal magnitudes are multiplied by two to give output signals corresponding to 2A and 2B, respectively. The 2A output signal from amplifier 231 is coupled into the X coordinate ratio circuit 234 along with the summed output signal $A+B+C$. The X coordinate ratio circuit produces an output signal corresponding to the X coordinate of the charge centroid striking the anode by computing $2A/(A+B+C)$. The 2B output signal from amplifier 232 is coupled into Y coordinate ratio circuit 235 along with the summed signal A+B+C. Accordingly, Y coordinate ratio circuit 235 produces an output signal corresponding to the Y coordinate of the charge centroid striking the position sensitive anode by computing the value of $2B/(A+B+C)$. A real time analog readout of each detected event may be provided by coupling the X, Y position coordinate signals to a cathode ray oscilloscope 25 to produce a spatially positioned flash of light on the CRT screen 251 corresponding to the computed X, Y position coordinates.

CRT 25 must be triggered in some fashion to produce the flash of light on the screen timed with the input of the correct position coordinate signals from the ratio circuits 234 and 235. As shown in FIG. 11, various ways of producing a trigger signal may be utilized in conjunction with this invention. For example, a simple coincidence circuit 240 could be utilized to provide a trigger signal based on detecting coincidence of output signals from the amplifiers 210, 213 and 216. The coincidence circuit output would be timed to produce the trigger output signal to oscilloscope 25 at an appropriate time when the position coordinate signal outputs from ratio circuits 234 and 235 are accurately indicating the coordinates of a detected event. The coincidence circuit 240 may be utilized where no pulse height analysis of the energy of the detected event is desired.

If only detected events corresponding to a selected band of energies are desired to be imaged, an analog pulse height selector 236 may be utilized to produce the trigger signal to the cathode ray oscilloscope. The analog pulse height selector 236 is of conventional design and operates on the summed output signal from analog summing circuit 233. Analog pulse height selectors are typically tunable to a particular energy band so that detected events at different energies may be imaged by the system. Pulse height selection is typically used when the detector head incorporates a scintillation crystal as the detecting means such as in the detector head embodiment shown in FIG. 4. Such pulse height analysis is very useful in nuclear medical imaging applications to reject events which do not contribute to accurate spatial imaging of the distributed radiation source in the patient. Pulse height analysis may also be useful in other types of radiation imaging apparatus where rejection of detected events at unwanted energies enhances the image produced by the system.

Due to the high speed of microchannel plates and the anode types described herein, scintillation pulse height analysis can be accomplished digitally by counting the photoelectron events associated with one scintillation instead of by the normal method of measuring the total anode signal charge. The digital approach offers potentially improved pulse height resolution because the photoelectron events are weighted equally in counting their total number, whereas an analog accumulation suffers from the statistical spread in the response of the microchannel plates to individual photoelectron events.

A digital summing circuit 237 may be connected to the fast outputs of the preamplifiers 210, 213, and 216. Each detected photon coming off the scintillator in sequence will produce its own amplified electron beam striking the anode structure 113 and will accordingly produce an output signal from one of the fast output leads of the amplifiers 210, 213, and 216. The OR-gate 237 will produce an output when any one or more of its inputs receive a signal from an associated preamplifier and the output signals from OR-gate 237 will be accumulated in a fast digital counting circuit 238. A count selector 239 may then be utilized to select only events which produce a cascaded photon sequence falling within a certain digital number band.

Using digital energy determination may have further benefit since the energy is determined within the charge integration period of the amplifiers 210 and 213. Accordingly, since the X and Y coordinate ratio circuits take a certain finite amount of time to process the input signals to produce position coordinate output signals, it may be possible to utilize the count selector output to terminate the position coordinate computation for unwanted events and thus enable the detector electronics to be earlier prepared to respond to a subsequent detected event. This could have advantages in high count rate situations where signal pulse pile-up may otherwise be a problem due to the dead time of the electronics in processing a particular event.

Various types of analog ratio circuits may be utilized in the circuit embodiment of FIG. 11. For example, an ORTEC 464 position sensitive detector analyzer may be utilized. This position sensitive detector analyzer is based on a circuit which is disclosed in an article by C. R. Johannsen, "Analog Pulse Divider", *Review of Scientific Instruments*, Vol. 45, Number 8, August 1974, page 1017.

Another implementation of an analog ratio circuit is shown in block diagram form in FIG. 12. Two input signals to be ratioed are fed to separate peak sample and hold circuits 301 and 302 whose outputs are coupled to logarithm circuits 303 and 304. A difference circuit 305 is utilized to produce an output signal corresponding to the difference in the output signal levels from the logarithm circuits 303 and 304. The output of difference circuit 305 is then fed to an exponential circuit 306 which produces an output having a magnitude corresponding to the ratio of the two input signals.

A hybrid analog/digital technique is illustrated in block diagram form in FIG. 13. In this circuit the individual input signals to be ratioed are fed to peak sample and hold circuits 310 and 311. The output from the peak sample and hold circuit 310 corresponding to the numerator is fed to a comparator circuit 312. The other input to comparator circuit 312 is received from the multiplying digital-to-analog converter 314 which receives the denominator input from peak sample and hold circuit 311 and a trial digital code word from successive approximation register 315. The multiplying digital-to-analog converter 314 multiplies the analog signal input from peak sample and hold circuit 311 corresponding to the denominator of the ratio by the trial digital code word from the successive approximation register 315 to produce a corresponding analog input signal to comparator circuit 312. The comparator circuit 312 then determines whether the numerator (2A) is greater than the value of the digital code times the denominator $(A+B+C)$. The output of the comparator circuit is a digital one value if the numerator is greater and causes successive approximation register to increment to the next trial digital code value. When a digital code value is reached where the numerator is not greater than the output of the multiplying digital-to-analog converter 314, then the comparator circuit produces a zero output and incrementing of the successive approximation register ceases. The digital code output on bus 316 at that time represents a digital word corresponding to the ratio $2A/(A+B+C)$. The operation of these circuit blocks is controlled by an overall control circuit (not shown). The peak sample and hold circuits 310 and 311 may comprise RCA part CD4066. The multiplying digital to analog converter may utilize part AM6012 from Advanced Micro Devices. The comparator circuit 312 may be part CMP-01 available from Precision Monolithics. The successive approximation register 315 may be Motorola part number MC14559.

FIG. 14 discloses an all digital system which optionally involves telemetering of the digital data to a remote receiver. Specifically each of the slow outputs 425, 427, and 429 from the preamplifiers 422, 423, and 424 are separately digitized in analog-to-digital converters 435, 436, and 437. Fast outputs 426, 428 and 430 are fed to an OR-gate 431 for digital counting of photoelectron events in digital counting circuit 432 in a manner similar to that described previously in connection with FIG. 11. If remote telemetering is to be employed, all of the digital words on output buses 438-440 and 442 from the analog-to-digital converters 435-437 and from the digital counting circuit 432 are coupled to the telemetry and transmitter system 443. The telemetry and transmitter system 443 transmits the digital signals via an antenna 444 to a receiving antenna 445 at a remote location. The receiver 446 detects the transmitted signals and communicates the detected digital signals to a computer system 447 where the digital signals may be transformed into position coordinates using the appropriate position coordinate algorithm. Alternatively, the digital word outputs on buses 438, 438, and 440 from the analog-to-digital converters and the output bus 442 from digital counting circuit 432 may be directly bused to computer system 447 where position coordinate computation and display or storage may be effected.

Count selector 433 may be utilized to determine those events which will be subjected to full analog-to-digital conversion using an output signal fed over output line 434. Other control functions may also be implemented using a count selector or other circuitry utilizing the digital counting circuit output on bus 442.

Other options in an all digital system would involve computation of position coordinate signals in a digital arithmetic unit prior to telemetry and transmission. Using the all digital approach numerous information storage and manipulation features can be included in the system and great flexibility in dealing with the position information output from the detector is possible.

It is intuitively apparent that if the partition coefficients corresponding to the amount of charge collected by each set of anodes are to be linear, as required for distortionless imaging, the footprint of the charge cloud arriving at the position sensitive anode must be large enough to span at least a few of the individual wedge and strip regions. If the charge cloud were too finely focused on the anode, large errors will be introduced in the derived X and Y position coordinates having a periodicity in X equal to the length of the quartet period of the anode. If the quartet period is denoted p and the charge density distribution is modeled by a Gaussian function with RMS radius r, the partition coefficients for the four electrode signal charges, denoted $Q_i$ (normalized to the total detector output charge Q) may be expressed by the following series:

$$\frac{Q_i}{Q} =$$

-continued $$f_i + 2 \sum_{n=1}^{\infty} \frac{\sin(n\pi f_i)}{n\pi} \exp\left(\frac{-2n^2\pi^2 r^2}{p^2}\right) \cos(n\phi_i) \quad i = 1,4.$$

In this expression, $F_I$ represents the local fraction of anode area occupied by electrode I, determined at the charge centroid position. In a lossless anode, $F_1+F_2=0.5$ and $F_3+F_4=0.5$ everywhere on the anode. The distances $D_i$ separating the charged centroid from the centers of the four nearest electrode elements are represented by the electrodes' phases within the quartet period, $\theta_i=2\pi D_i/p$. The first term in the above expression, $F_i$ is the desired component of the anode signal that leads to a spatially linear or undistorted image. The series terms correspond to geometric distortions at increasing spatial frequencies. When these theoretical signal charge expressions are substituted into estimator equations for centroid location, for example $Q1-Q2/Q1+Q2$ for a four set anode such as depicted in FIGS. 6 and 7, the magnitude of the peak position error, expressed as a fraction of the overall anode length, is dominated by the n=1 term in the series if p is less than or equal to r, and is $(2\sqrt{2}/\pi \exp(-2\pi 2r^2/p^2)$. The theoretical position error is less than one percent for p=2r, and diminishes rapidly for smaller p. It can thus be concluded that as long as the anodes' spatial quartet period (or other period) is kept smaller than the radius of the deposited signal charge distribution, geometrical distortions will be set by practical limitations such as manufacturing tolerances, rather than by any problems inherent to the readout technique.

Two prototypes of radiation image apparatus of the type depicted in FIG. 1 have been constructed, each using a tandem pair of microchannel plates, a wedge and strip anode structure, three or four charge amplifiers depending on the type of wedge and strip anode used, and a pair of analog ratio pulse position analyzers. The microchannel plates utilized were Model 175, manufactured by ITT Corporation. These microchannel plates have a 40:1 length to diameter ratio, a bore of 12 micrometers and an overall circular field of view which is 25 millimeters in diameter.

The anodes for the prototypes were manufactured using techniques commonly employed in printed circuit board fabrication. The first anode utilized the wedge and strip geometry of FIG. 6. A layout was first created at a 24:1 magnification by applying strips of black tape to mylar film in the desired pattern of the insulating gaps between anode regions. Then a 1:24 photographic reduction of the mylar film pattern was produced and the resulting negative was used to contact print a KPR sensitized epoxy fiberglass circuit board laminated with a copper layer with a thickness of about 7.5 micrometers. After the photoresist pattern was developed, the anode was etched and cleaned. Thereafter holes were drilled and wires soldered in place to electrically connect the individual elements of the two sets of wedge anode regions. The finished anode was 25 millimeters square and the wedge and strip pattern has seventeen quartets with a period of 1.5 millimeters. The wedge and strip regions are separated by insulating gaps of about 30 micrometers. The capacitance between each set of regions and the other three sets together measured about 40 picofarads.

The anode was initially mounted six millimeters behind the exit face of the rear microchannel plate. The two microchannel plates were separated by a gap of 250 micrometers which was biased at 250 to 300 volts. Voltage differentials of 750 to 800 volts were applied to the individual microchannel plates and resulted in overall mean electron gains of 0.6 to $3.5 \times 10^6$. The signals from the output signal pads of the first sets of wedge and strip regions of the anode were fed into charge sensitive amplifiers with gains of $10^{13}$ volts per coulumb and one microsecond charge integration time constants. The shaped output pulses from the amplifiers were coupled to a pair of analog ratio circuits which utilized the logarithm-exponential ratio method depicted in FIG. 11. The outputs of these analog ratio circuits were coupled to an X-Y display oscilloscope. The display of the oscilloscope was photographed using twenty to forty second exposure times to accumulate an image of detected events.

To explore the imaging properties of the system, a resolution mask was placed in front of the first microchannel plate and a shadowgram was formed by illuminating the detector through the resolution mask with diffused 584 Angstrom radiation emitted by a hollow cathode helium-iodide discharge tube. The images produced on the photographic film with the 6 millimeter gap between the anode and the exit face of the second microchannel plate exhibited periodic geometric distortions. From the amplitude of the periodic distortions it was inferred that the ratio of the rms radius of the electron cloud footprint to the quartet period of the anode was approximately 0.5.

To permit the electron cloud to expand further to a larger footprint, and thus to increase the ratio to a value greater than 1, the gap between the second microchannel plate and the position sensitive anode was increased to 11 millimeters. Photographic images of the resolution mask produced with this anode-microchannel plate gap exhibited no noticable periodic distortions. Considerable overall distortion occurred, but was attributed to stray electrostatic fields and protruding solder which destroyed the planar geometry of the electric field in the post-acceleration gap between the microchannel plate and the anode. The resolution of the detector head utilizing this first anode was considered excellent, with the smallest set of test bars in the resolution mask pattern separated by 100 micrometers usually resolved at both low and moderate gains of the microchannel plates. It was estimated that the resolution of the detector head was better than 50 micrometers at a mean gain of $3 \times 10^6$, giving an image of $500 \times 500$ pixels over the 25 millimeter field of view. The predominant contribution to the random position error in individual detected events was amplifier noise which was measured to be 1300 rms electrons.

A second position sensitive anode was fabricated to test the improved geometry of the wedge and strip anode depicted in FIG. 8 which eliminates the necessity for sub-plane connections and thus considerably simplifies fabrication of the anode while providing a planar electrostatic field. To fabricate this second anode a 10:1 master layout was made with a computer controlled photographic plotter incorporating a numerically driven plotting head to produce the pattern directly on a mylar sheet. This technique permits a mask of essentially an arbitrary dimension and pattern density to be produced rapidly at very little cost. The 10:1 pattern was then photographically reduced and used as a contact printing mask in a standard photolithography procedure. The finished anode measures $35 \times 35$ millimeters and each set of wedge and strip regions has thirty-three individual elements, repeating with a period of one millimeter. The gaps between the regions are 50 micrometers and the inter-region capacitance was 95 picofarads for each of two of the sets of regions and 160 picofarads for the third set of anode regions.

This second position sensitive anode was installed in a small housing which included guard rings to establish a planar electric field in the gap between the anode and the microchannel plate. With a microchannel plate-anode gap of 12.5 millimeters, a microchannel plate gain of $3 \times 10^6$, and an anode gap potential of 300 volts, another resolution test mask image was obtained utilizing the same approach as described previously. The periodic distortion was observed to be less than $\pm 0.05$ percent of full scale. The resolution of this second detector head was judged to be better than 100 micrometers which yields approximately $250 \times 250$ pixels over the 25 millimeter useful field of view of the microchannel plates. The reduction in resolution of this second detector head is attributable to the increased amplifier voltage noise associated with the larger anode interelectrode capacitance which was measured to be 1600 electrons rms for the charge amplifiers associated with the set of wedges B2 and the set of strips A1, and 2100 electrons rms for the set of trapezoids C2.

One of the advantages of the imaging system of this invention is that the parameters involving the number of wedge and strip groups in the anode, the overall anode size and the distance of the anode from the charge emitting surface may all be varied to tailor the image resolution and linearity characteristics of the system to particular imaging requirements.

While the features of this invention have been described above in conjunction with various embodiments, it should be apparent that numerous alternative embodiments could be employed without departing from the scope of this invention. In particular, it should be apparent that this invention is not limited to the use of microchannel plates. The improved position-sensitive anode geometries of this invention may be applied to detectors for any type of localized radiation which produces a charge cloud on the position-sensitive anode.

What is claimed is:

1. Apparatus for imaging incident photons, ions, electrons or nuclear particles, comprising:

event detecting means, including at least one charge multiplying means, for detecting an incident event and supplying at least one free charged particle to said charge multiplying means, an output surface of said charge multiplying means thereby emitting a multiplied charge spatially correlated to the position of said detected event; and position sensitive anode means mounted substantially parallel to said output surface and at a moderate distance therefrom to permit said emitted charge to expand to a charge cloud before striking said anode means, the centroid of said charge cloud being spatially correlated to the position of said detected event, said anode means comprising a repetitive pattern of charge collecting regions geometrically arranged and connected to encode said charge cloud incident thereon into a plurality of electrical signals indicating the coordinate position of said centroid in a preselected system.

2. Apparatus as claimed in claim 1, wherein the period of said repetitive pattern of wedge and strip regions and the distances between said output surface and said anode are prearranged such that said period is smaller than the radius of said charge cloud striking said anode.

3. Apparatus as claimed in claim 1, wherein said position sensitive anode means comprises an insulating substrate with a thin layer of metal carried on a front surface thereof facing said output surface of said event detecting means, said thin layer of metal being formed into said repetitive pattern of charge collecting regions, said geometric arrangement of said regions being preselected to provide interconnection thereof by regions of said metal layer itself.

4. Apparatus as claimed in claim 3, wherein said geometric arrangement of said charge collecting regions consists of four sets of regions comprising two sets of wedges and two sets of strips, two of said four sets being interleaved across the width of said anode and the other two sets being disposed in continuously connected arrays between said interleaved sets, all of said wedges having a charge collecting area varying linearly from apex to base, said first and second sets of strips having widths which vary linearly in opposite senses with the positions of said regions across the width of said anode, whereby the coordinate position of said centroid is given by one of the sets of equations $X=C/(C+D)$, $Y=A/(A+B)$ for X and Y varying between 0 and 1 or $X=(C-D)/(C+D)$, $Y=(A-B)/(A+B)$ for X and Y varying between $-1$ and $+1$ where C and D are the magnitudes of charge collected on said sets of strips and A and B are the magnitudes of charge collected on said sets of wedges.

5. Apparatus as claimed in claim 3, wherein said geometric arrangement consists of three sets of regions comprising one set of wedges, one set of strips and one set of trapezoids, two of said three sets of regions being interleaved across the width of said anode, and the third set being disposed in a continuously connected array between said interleaved sets, said wedges having a charge collection area varying linearly from apex to base thereof, said strips having respective widths varying linearly from one side of the anode to the other, and said trapezoids having major and minor base dimensions varying from one side of the anode to the other in a sense opposite to that of said strips, the respective geometries of said sets of wedges and strips and trapezoids being arranged such that the coordinate position of said centroid is given by $X=2A/(A+B+C)$, $Y=2B/(A+B+C)$ where A is the magnitude of charge collected on said set of strips, B is the magnitude of charge collected on said set of wedges, and C is the magnitude of charge collected on said trapezoids.

6. Apparatus as claimed in any of claims 1, 2, 3, 4 and 5 and being adapted to detect incident photons, wherein said input surface means is a cathode assembly comprising a transparent substrate mounted in front of a front surface of said microchannel plate and a thin layer of electron emissive cathode material formed on a back surface of said substrate, and wherein said event detecting means further comprises means for focusing electrons produced in said cathode onto a front surface of said microchannel plate to maintain spatial correlation between the detected event at said cathode and the centroid of said charge cloud emanating from said event detecting means.

7. Apparatus as claimed in claim 5, further comprising three low noise amplifier circuits each coupled to an individual one of said three sets of regions for producing three separate output electrical signals corresponding to the magnitudes of charge collected on associated sets of anode regions, and position computing circuit means coupled to the outputs of said amplifiers for computing the X,Y position coordinates of detected event and producing output electrical signals corresponding to said position coordinates.

8. A position sensitive anode adapted to detect the centroid of a cloud of charged particles incident thereon, said anode comprising an insulating substrate with a thin layer of metal carried on a front surface thereof for intercepting said cloud of charged particles, said thin layer of metal being formed into a repetitive pattern of charge collecting regions geometrically arranged and connected to encode said charge cloud into a plurality of electrical signals indicative of the position of said centroid, said geometric arrangement being preselected to provide interconnection thereof by regions of said metal layer itself.

9. The position sensitive anode of claim 8, wherein said geometric arrangement of said charge collecting regions consists of four sets of regions comprising two sets of wedges and two sets of strips, two of said four sets being interleaved across the width of said anode and the other two sets being disposed in continuously connected arrays between said interleaved sets, all of said wedges having a charge collecting area varying linearly from apex to base, said first and second sets of strips having widths which vary linearly in opposite senses with the positions of said regions across the width of said anode, whereby the coordinate position of said centroid is given by one of the sets of equations $X=C/(C+D)$, $Y=A/(A+B)$ for X and Y varying between 0 and 1 or $X=(C-D)/(C+D)$, $Y=(A-B)/(A+B)$ for X and Y varying between $-1$ and $+1$ where C and D are the magnitudes of charge collected on said sets of strips and A and B are the magnitudes of charge collected on said sets of wedges.

10. The position sensitive anode of claim 8, wherein said geometric arrangement consists of three sets of regions comprising one set of wedges, one set of strips and one set of trapezoids, two of said three sets of regions being interleaved across the width of said anode, and the third set being disposed in a continuously connected array between said interleaved sets, said wedges having a charge collection area varying linearly from apex to base thereof, said strips having respective widths varying linearly from one side of the anode to the other, and said trapezoids having major and minor base dimensions varying from one side of the anode to the other in a sense opposite to that of said strips, the respective geometries of said sets of wedges and strips and trapezoids being arranged such that the coordinate position of said centroid is given by $X=2A/(A+B+C)$, $Y=2B/(A+B+C)$ where A is the magnitude of charge collected on said set of strips, B is the magnitude of charge collected on said set of wedges, and C is the magnitude of charge collected on said trapezoids.

11. Apparatus for imaging incident radiation comprising:
   means for detecting said radiation and producing a traveling charge cloud in response thereto with the centroid of said charge cloud spatially correlated to the position of said detected radiation; and
   a position sensitive anode interposed in the path of said charge cloud for detecting the coordinate position of said centroid thereof in a preselected coordinate system, said position sensitive anode comprising an insulating substrate with a thin layer of metal carried on a front surface thereof for intercepting said charge cloud, said thin layer of metal being formed into a repetitive pattern of strip and wedge regions geometrically arranged and connected to encode said charge cloud into a plurality of electrical signals indicative of the position of said centroid thereof in said coordinate system, said geometric arrangement being preselected to provide interconnection thereof by regions of said metal layer itself.

12. Apparatus as claimed in claim 11, wherein the period of said repetitive pattern of wedge and strip regions is smaller than the radius of said charge cloud at the point said cloud strikes said anode.

13. Apparatus as claimed in claim 11, wherein said geometric arrangement of said charge collecting regions consists of four sets of regions comprising two sets of wedges and two sets of strips, two of said four sets being interleaved across the width of said anode and the other two sets being disposed in continuously connected arrays between said interleaved sets, all of said wedges having a charge collecting area varying linearly from apex to base, said first and second sets of strips having widths which vary linearly in opposite senses with the positions of said regions across the width of said anode, whereby the coordinate position of said centroid is given by one of the sets of equations $X=C/(C+D)$, $Y=A/(A+B)$ for X and Y varying between 0 and 1 or $X=(C-D)/(C+D)$, $Y=(A-B)/(A+B)$ for X and Y varying between $-1$ and $+1$ where C and D are the magnitudes of charge collected on said sets of strips and A and B are the magnitudes of charge collected on said sets of wedges.

14. Apparatus as claimed in claim 11, wherein said geometric arrangement consists of three sets of regions comprising one set of wedges, one set of strips and one set of trapezoids, two of said three sets of regions being interleaved across the width of said anode, and the third set being disposed in a continuously connected array between said interleaved sets, said wedges having a charge collection area varying linearly from apex to base thereof, said strips having respective widths varying linearly from one side of the anode to the other, and said trapezoids having major and minor base dimensions varying from one side of the anode to the other in a sense opposite to that of said strips, the respective geometries of said sets of wedges and strips and trapezoids being arranged such that the coordinate position of said centroid is given by $X=2A/(A+B+C)$, $Y=2B/(A+B+C)$ where A is the magnitude of charge collected on said set of strips, B is the magnitude of charge collected on said set of wedges, and C is the magnitude of charge collected on said trapezoids.

15. Apparatus as claimed in claim 11, wherein said detecting means comprises at least one microchannel electron multiplying plate with a back electron emitting surface of said microchannel plates spaced a moderate distance from said position sensitive anode to produce said traveling electron cloud.

16. Apparatus as claimed in claim 11, wherein said detecting means comprises a scintillator mounted in the path of incident radiation quanta for converting each detected quantum into a traveling cloud of light photons having a centroid spatially correlated with the position of said detected quantum, a photocathode structure mounted a moderate distance behind said scintillator for converting said cloud of light photons into a corresponding cloud of electrons, and electron multiplier means mounted between said photocathode structure and said position sensitive anode for producing a multiplied traveling electron cloud.

17. Apparatus as claimed in claim 16, further comprising a plurality of low noise amplifiers receiving said electrical signals from said position sensitive anode, and position computing circuit means coupled to the outputs of said preamplifiers for computing the position coordinates of each detected radiation quanta and producing output electrical signals corresponding to said position coordinates.

18. Apparatus as claimed in claim 17, wherein said scintillator produces a sequence of individual light photons in rapid succession in response to each detected quantum with the total number of said photons corresponding to the energy of said detected quantum, said photocathode produces a corresponding sequence of individual electrons corresponding to individual light photons arriving from said scintillator, said electron multiplier means separately multiplies each of said individual electrons to produce a sequence of multiplied electron cloud events at said anode, said amplifiers are each responsive to individual electron cloud events to produce a first output signal corresponding thereto and being responsive to the integrated number of said sequence of multiplied electron cloud events to produce a second output signal corresponding substantially to the total charge collected on an associated set of strip or wedge regions of said anode, and further comprising circuit means receiving said first output signal in response to any one or more of said first output signals, and counting circuit means for counting output signals from said circuit means to produce an indication of the energy of each detected quantum of radiation.

19. Apparatus as claimed in claim 14, further comprising three low noise amplifiers each coupled to a set of regions for producing three separate output electrical signals corresponding to the magnitude of charge collected on associated sets of anode regions, and position computing circuit means coupled to the outputs of said amplifiers for computing the position coordinates of each detected radiation quantum and producing output electrical signals corresponding to said position coordinates.

* * * * *